United States Patent [19]

Yelke

[11] 4,319,481
[45] Mar. 16, 1982

[54] CLIP-ON PIEZOELECTRIC TRANSDUCER

[76] Inventor: Edward Yelke, 945 S. Kensington, La Grange, Ill. 60525

[21] Appl. No.: 99,527

[22] Filed: Dec. 3, 1979

[51] Int. Cl.³ .......................................... G01M 15/00
[52] U.S. Cl. ................................................ 73/119 A
[58] Field of Search ................... 73/753, 754, 119 A; 310/338

[56] References Cited

U.S. PATENT DOCUMENTS 4,109,517  8/1978  Dyballa et al. .................. 73/119 A
4,187,720  2/1980  Baker ................................ 73/119 A
4,194,401  3/1980  Claassen et al. ............. 73/119 A X Primary Examiner—Jerry W. Myracle
Attorney, Agent, or Firm—Robert E. Wagner; Leo J. Aubel

[57] ABSTRACT

A system for sensing and monitoring the injection of fuel into a fuel injection type engine including a piezoelectric transducer which is affixed to a clip-on mounting for selectively attaching to the return line side of the injection nozzle to sense a vibration or shock wave and thereby generate a useful electrical signal.

3 Claims, 7 Drawing Figures

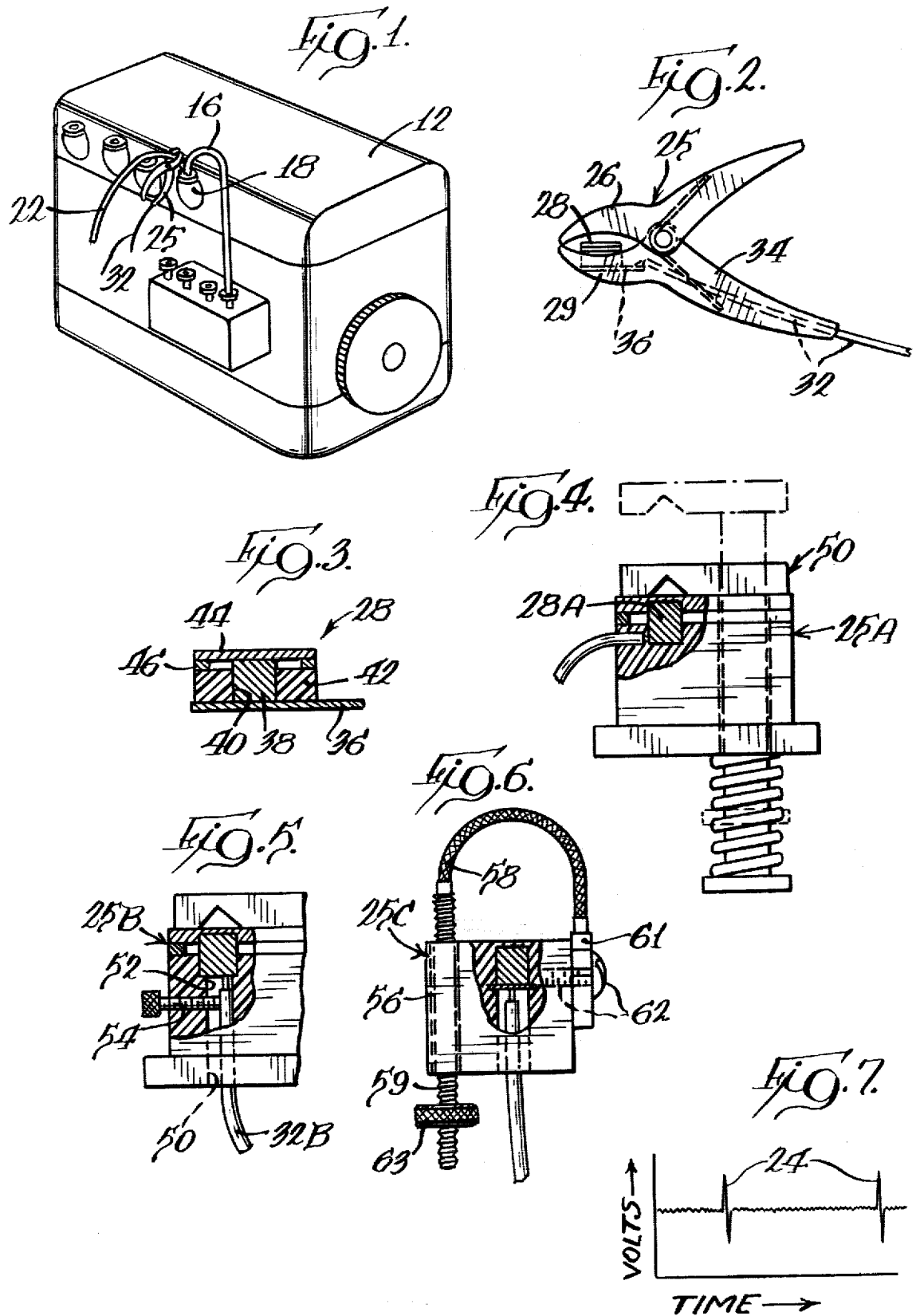

CLIP-ON PIEZOELECTRIC TRANSDUCER

BACKGROUND OF THE INVENTION AND STATEMENT OF THE PRIOR ART

The present invention relates generally to a device and method for sensing the vibration or shock wave on the fuel return line of a fuel injection engine to obtain an electrical signal which may be usable for various purposes, such as in tachometer measurements.

A number of devices are known which provide a sensing mechanism for sensing the fuel applied through a fuel line to a fuel injection engine. One such system is shown in U.S. Pat. No. 3,327,526 issued to J. N. North wherein a sensing device is positioned around the fuel line and comprises a microswitch which is caused to open and close in response to the surge of fuel through the fuel line. Another such system for sensing the fuel injection to an engine is disclosed in U.S. Pat. No. 3,511,088 issued to P. R. Weaver. Another improved system for sensing the fuel injection to an engine is shown in U.S. Patent application Ser. No. 949,061 now U.S. Pat. No. 4,192,179 entitled Piezoelectric Transducer for Fuel Injection Engine, filed in the name of Edward Yelke, the inventor of the present invention.

In contrast to the prior art, the inventor has now found that a very useful electrical signal can be generated, such as for measuring rpm, by sensing or monitoring the fuel output or fuel by-pass system of a diesel engine. Also, the present invention provides an improved, yet simpler, transducer than those shown in the prior art.

Accordingly, it is a principal object of the present invention to provide a simple effective transducer to obtain an electrical signal to obtain rpm measurements.

The inventive transducer is widely useful since it operates with the fuel injection system of the associated diesel engine and a high pressure injection pump and injection lines are common to a vast majority of diesel engines.

The inventive transducer does not require a complex switching arrangement to correct for the large number of gear and pulley ratios that are available in current engines, and it also eliminates any switching requirements to compensate for varying numbers of cylinders in the engine.

SUMMARY OF THE INVENTION

The present invention is directed to a transducer apparatus and a method of obtaining a signal from a diesel engine such as is useful in obtaining the rpm of an engine. The inventive transducer is in the form of a piezoelectric material positioned on a readily attachable clip-on mounting for mounting such as on the fuel lines of the engine. It is also important to note that the clip-on mounting is selectively positioned or mounted on the output or return line of the fuel system. The return line provides a fuel return path for the small amount of fuel that by-passes the spring loaded injection needle valve and spring assembly of the fuel injection nozzle.

The foregoing features and advantages of the present invention will be apparent from the following more particular description of the invention. The accompanying drawings listed hereinbelow are useful in explaining the invention wherein:

DESCRIPTION OF THE DRAWINGS

FIG. 1 is an isometric sketch of a diesel engine with the inventive transducer shown mounted on a fuel return line;

FIG. 2 is a side elevation of one embodiment of the inventive clip-on transducer;

FIG. 3 is a relatively enlarged cross-sectional view of the piezoelectric material assembly of FIG. 2;

FIG. 4 is a plan view of a second embodiment of the inventive transducer;

FIG. 5 is a plan view of a third embodiment of the inventive transducer;

FIG. 6 is a plan view of a fourth embodiment of the inventive transducer;

FIG. 7 is a waveform showing the electrical signal output of the inventive transducer.

DESCRIPTION OF THE PREFERRED EMBODIMENT OF THE INVENTION

Refer first to FIG. 1 which shows a combustion engine of the diesel type represented by the reference numeral 11 and comprising an engine block 12 having a plurality of cylinders. A fuel injection system includes a pump (not shown) mounted in a housing 19 on the engine 12 and connected by a line 16 through injection nozzle assemblies 18 to respective cylinders, as is known in the art.

As is well-known in the diesel engine art, each nozzle assembly 18 includes an internal spring loaded valve (not shown), which is hydraulically opened by the fuel provided by the pump in pump housing 19 as the pressure exerted by the fuel-forced nozzle assembly 18 exceeds a predetermined minimum level. Air supplied to the cylinder through a suitable valve port (not shown) is compressed during upward movement of the piston. After closure of the port and while compression is still increasing within the cylinder, the fuel pump in housing 19 supplies fuel to the line 16. When the pressure of the fuel within the line 16 is sufficient to open the spring loaded valve in the nozzle assembly 18, ejection into the cylinder begins. The combination of heat and pressure within the combustion chamber expands and ignites the fuel, resulting in a still further and more rapid increase in pressure to begin the power stroke which forces the piston downward in the cylinder.

As described in the above-mentioned patent application Ser. No. 949,061, incorporated herein by reference, and the other patents cited hereinabove, the prior art provided sensing mechanisms for sensing the surge of fuel or fuel pressure effective on the fuel line 16 to thereby provide an electrical signal to monitor engine performance. The present invention utilizes a distinct system and method for obtaining an electrical signal to monitor engine performance. More specifically, it has been found that a useful monitoring signal with a very high signal-to-noise ratio, is obtainable on the output or return line 22 side of the injection nozzle. As is well-known, return line 22 is used to return the small amount of fuel that by-passes the fuel-forced nozzle assembly to the main fuel supply tank (not shown). The exact phenomena of this operation is not fully understood, however, a high amplitude signal 24 is developed on the output or return side of the system as indicated in FIG. 7. One explanation appears to be that as the fuel feed head is aligned with a particular line, that line starts receiving fluid under an increasing pressure. As the head continues to rotate, the fluid flow to that line is shut off (conventionally termed as port opening in a pump). It is believed that a "jack hammer" effect developed in the line generates the signal which the inventive transducer senses. As is known, the jack hammer effect is the vibration and reverberation which may occur in a line due to sudden fluid stoppage caused by shutting-off of the flow of high pressure fluid through the line.

While the shock or vibration is probably present throughout the input line and nozzle housing, the masking effects of the high pressure fluid and noise caused by injection line vibrations make it unfeasible to sense this signal 24 at the injection line side of the fuel injection system. Accordingly the inventive transducer 25 is clipped to some member of the return line to sense signal 24. The details of the inventive transducer will be described hereinafter.

While it is important that the inventive piezoelectric transducer 25 be coupled to the return line system, the exact point or location at which the transducer 25 is clamped to the return line system appears not to be critical.

The high signal-to-noise ratio makes the signal 24 ideal for a tachometer pick up. The signal 24 shown in FIG. 7 is a graph of the waveforms taken on an oscilloscope; the waveforms were taken at engine idle speed with no load on the engine. The signal amplitude and signal-to-noise ratio actually improve as speed is increased because of higher initial pump pressures and faster rise and fall time of pressure in the lines. Signals of 15 volts peak amplitudes were obtained using a Mallory PC-5 type pulse transducer and signals of one to two volts were obtained with a commonly available single layer piezoelectric disk.

A first embodiment of inventive transducer 25 is shown in FIG. 2 and comprises a plier-shaped spring clip 26 having a piezoelectric assembly 28 mounted on one jaw 29 of the clip 26. An insulated electric wire 32 extends from the piezoelectric assembly 28 through one arm 34 of the clip 26, and can be connected such as to a tachometer to couple the electrical signal 24 generated by the piezoelectric assembly 28.

A cross-sectional view of the piezoelectric assembly 28 is shown in FIG. 3 and comprises a copper clad fiber glass backing 36. Piezo stack material 38 is positioned in a recess 40 of a metal support 42, such as aluminum. Backing 36 is affixed to electrical wire 32 as by soldering. A metallic lid 44 is bonded to the support by suitable conductive rubber 46 to complete the housing around the piezoelectric material 38. The piezo stack material 38 is bonded to the lid 44 with a suitable epoxy.

Enclosing the piezoelectric material 38 in a protective housing of approximately 1/16 inch thickness appears to decrease the signal amplitude only a few percent. This allows the piezoelectric material to be completely encapsulated for protection against breakage and contamination by dirt and diesel fuel.

A second embodiment 25A of the inventive transducer is shown in FIG. 4 and comprises a conventional spring loaded clip 50 which opens longitudinally or upwardly as oriented in FIG. 4. The dotted lines of FIG. 4 indicate the open position of clip 50. The piezoelectric assembly 28A of FIG. 4 is essentially similar to piezoelectric assembly 28 of FIGS. 2 and 3, and is positioned in one of the jaws of clip 50.

FIG. 5 shows an embodiment of the inventive transducer 25B which is essentially identical to that of FIG. 4 with the difference that the conductive lead 32B is inserted through a hole 52 formed in the body of clip 50 and secured in position as by a screw 54.

FIG. 6 shows an embodiment of the inventive transducer 25C utilizing a clip 56 having a metal strap 58 affixed to an adjustable screw 59 for varying the diameter of the strap loop. Strap 58 includes a C-shaped hook 61 which removably engages an extending lug 62, and nut 63 screws onto screw 59 to tighten strap 58 in position.

While the invention has been particularly shown and described with reference to a preferred embodiment thereof, it will be understood by those skilled in the art, that various changes in form and details may be made therein without departing from the spirit and scope of the invention.

For example, while different mounting means for a single piezoelectric assembly have been shown and described, the transducer disclosed and claimed in the above referenced co-pending application could also be used in carrying out the method aspect of the invention. Also, two or more piezoelectric assemblies could be used with each of the mounting means described above.

I claim:

1. A transducer for removably mounting onto the fluid injection line members coupling to a fluid injection nozzle assembly which controls the injection of fluid to an injection type engine, said transducer comprising in combination, a relatively rigid mounting means having an opening thereon for clipping onto a fluid injection line member, piezoelectric material positioned on a surface of said mounting means for positioning in engagement with said line member and being operable to generate an electrical signal dependent on vibration of said line member, and an electric connector connecting said piezoelectric material to associated electronic circuitry.

2. The method of claim 1 including the step of affixing the transducer directly onto the return line for sensing the shock or vibration caused therein in response to the operation of fluid injection.

3. The method of claim 1 including the step of clipping the transducer onto the fluid return side of the system to sense a jack hammer effect on said line.

* * * * *